United States Patent
Ivenz et al.

(10) Patent No.: US 11,215,517 B2
(45) Date of Patent: Jan. 4, 2022

(54) CLAMPING FORCE MEASURING INSTRUMENTS AND MODULES THEREOF

(71) Applicant: HAINBUCH GMBH SPANNENDE TECHNIK, Marbach (DE)

(72) Inventors: Sebastian Ivenz, Grossbottwar (DE); Andreas Keller, Marbach (DE)

(73) Assignee: HAINBUCH GMBH SPANNENDE TECHNIK, Marbach (DE)

( * ) Notice: Subject to any disclaimer, the term of this patent is extended or adjusted under 35 U.S.C. 154(b) by 222 days.

(21) Appl. No.: 16/482,010

(22) PCT Filed: Feb. 14, 2018

(86) PCT No.: PCT/EP2018/053700
§ 371 (c)(1),
(2) Date: Jul. 30, 2019

(87) PCT Pub. No.: WO2018/171981
PCT Pub. Date: Sep. 27, 2018

(65) Prior Publication Data
US 2020/0003642 A1 Jan. 2, 2020

(30) Foreign Application Priority Data
Mar. 24, 2017 (DE) .................... 10 2017 205 024.1

(51) Int. Cl.
*G01L 5/00* (2006.01)
*H04Q 9/02* (2006.01)
*B23Q 17/00* (2006.01)

(52) U.S. Cl.
CPC ............ *G01L 5/009* (2013.01); *H04Q 9/02* (2013.01); *B23Q 17/005* (2013.01);
(Continued)

(58) Field of Classification Search
CPC ................................ G01L 5/0009; H04Q 9/02
See application file for complete search history.

(56) References Cited

U.S. PATENT DOCUMENTS

| 4,489,619 A | 12/1984 | Steinberger |
| 2013/0147133 A1 | 6/2013 | Kaleja |

(Continued)

FOREIGN PATENT DOCUMENTS

| DE | 102004003271 B3 | 10/2005 |
| DE | 102010011318 B3 | 9/2011 |

(Continued)

OTHER PUBLICATIONS

International Search Report with English translation, issued in International Application No. PCT/EP2018/053700, dated Apr. 24, 2018 (6 pages).

(Continued)

*Primary Examiner* — Curtis B Odom
(74) *Attorney, Agent, or Firm* — Flynn Thiel, P.C.

(57) ABSTRACT

A clamping force measuring instrument for a radial clamping device having at least one force sensor for detecting a clamping force of the clamping device and an evaluation device for evaluating sensor data of the force sensor. The clamping force measuring instrument is embodied as a modular clamping force measuring instrument, having an evaluation module a sensor module. The sensor module includes at least one measurement surface and the force sensor. The evaluation module has a radio interface, a memory and/or a display device. The sensor module and the evaluation module are configured for coupling to one another by a coupling device and each has a data connection device. The data connection devices are connected to one another to produce a data connection in the event of the sensor module being coupled to the evaluation module.

20 Claims, 3 Drawing Sheets

(52) U.S. Cl.
CPC ..... *B23Q 2717/00* (2013.01); *H04Q 2209/10* (2013.01); *H04Q 2209/30* (2013.01); *H04Q 2209/40* (2013.01); *H04Q 2209/826* (2013.01); *H04Q 2209/88* (2013.01)

(56) References Cited

U.S. PATENT DOCUMENTS

| | | | | |
|---|---|---|---|---|
| 2014/0095102 A1* | 4/2014 | Potyrailo | ............... | G01R 27/28 702/127 |
| 2015/0165673 A1* | 6/2015 | Spicer | ................... | B23K 31/12 156/64 |

FOREIGN PATENT DOCUMENTS

| | | | |
|---|---|---|---|
| DE | 102010039608 A1 | 1/2012 | |
| DE | 102011011685 A1 | 8/2012 | |
| EP | 0074524 A1 | 3/1983 | |
| JP | 7308808 A | 11/1995 | |

OTHER PUBLICATIONS

Written Opinion of International Searching Authority, issued in International Application No. PCT/EP2018/053700, dated Apr. 24, 2018 (6 pages).

Office Action of German Patent Office issued in German Application No. 10 2017 205 024.1, dated Jan. 10, 2018 (5 pages).

\* cited by examiner

CLAMPING FORCE MEASURING INSTRUMENTS AND MODULES THEREOF

FIELD OF APPLICATION AND PRIOR ART

The invention relates to a clamping force measuring instrument for radial clamping means, to individual modules therefor and to a clamping force measuring instrument.

Generic clamping force measuring instruments are used for testing and, if appropriate, calibrating radial clamping means, that is to say internal or external clamping means, which, by means of radial displacement of clamping jaws, fixedly clamp a usually substantially rotationally symmetrical workpiece for the purpose of processing, in particular machining with a rotating workpiece.

In order to achieve high accuracies during this processing, it is necessary to maintain an intended clamping force as accurately as possible. An excessively low clamping force can result in the workpiece moving relative to the clamping means on account of the processing forces acting on said workpiece, such that at least an impaired processing quality is the consequence. An excessively high clamping force can result in damage to the workpiece, for example as a result of deformation of thin-walled workpieces.

Generic clamping force measuring instruments allow the clamping means to be tested by virtue of the fact that these instruments are clamped into the clamping means in an exactly calibrated state instead of a workpiece and, in the region of the bearing clamping jaws of the clamping means, measure the clamping force applied there. By way of example, a clamping force measuring instrument from Hainbuch Spannende Technik GmbH, offered under the name "TestIt", is known for this purpose.

Besides the measurement surfaces for bearing against the clamping jaws and the at least one force sensor that measures the force acting on the measurement surface, this clamping force measuring instrument also comprises the electronic components for storing and passing on the detected data. A measurement amplifier corrects the measured signal if appropriate on the basis of individual calibration values of the clamping force measuring instrument. The data thus detected and, if appropriate, corrected are forwarded by radio or cable connection to a central computer and are processed further there.

Users of such clamping force measuring instruments usually have a plurality thereof in order to be able to test different clamping means. The different clamping force measuring instruments differ with regard to the arrangement of the measurement surfaces (facing outward or inward) and with regard to the diameter and optionally the clamping forces for which they are intended.

Some disadvantages of the previous system should be noted in practice. Firstly, the costs of the clamping force measuring instruments are very high on account of components which in some instances are very expensive, particularly if a large number of different clamping means have to be tested regularly. Secondly, the administrative outlay is very high since the detected data are usually combined for the purpose of further processing by the individual clamping force measuring instruments at a computer and diverse data transfers are thus required. It is likewise occasionally disadvantageous that the clamping force measuring instruments have to be regularly charged and the situation is thus not uncommon that use cannot take place as planned since not all of the clamping force measuring instruments have been charged sufficiently.

Problem and Solution

The problem addressed by the invention is that of making available, proceeding from known clamping force measuring instruments, a more cost-effective alternative to known generic clamping force measuring instruments which is simple with regard to the handling of the instrument and the data obtained thereby.

In a manner corresponding to generic clamping force measuring instruments, the clamping force measuring instrument according to the invention comprises at least one force sensor for detecting a clamping force applied to at least one measurement surface of the clamping force measuring instrument by a clamping means to be tested in a radial direction outward or in a radial direction inward relative to a center axis.

For evaluating the sensor data ascertained here, the clamping force measuring instrument comprises an evaluation device. The latter comprises a radio interface for communicating data to a receiver and/or a memory for storing data for the purpose of later read-out via a cable connection or a radio connection and/or a display device for displaying data.

In the case of the clamping force measuring instrument according to the invention, the following is provided in this case: the clamping force measuring instrument is embodied as a modular clamping force measuring instrument and has at least two modules, namely an evaluation module and a sensor module.

The sensor module comprises at least the measurement surface and the force sensor. The evaluation module has at least the radio interface, the memory and/or the display device.

The two modules are configured for coupling to one another by means of a coupling device and each have a data connection device, wherein the two data connection devices can be connected to one another in order to produce a data connection in the course of the sensor module being coupled to the evaluation module.

The special characteristic of the clamping force measuring instrument according to the invention accordingly resides in the fact that it consists of modules which can be joined together in changing configurations on a case-by-case basis. This makes it possible, in particular, to provide the same evaluation module with different sensor modules in order thereby to be able to test different clamping means, which may differ in particular in the type (internal clamping means or external clamping means) and/or different diameters. It is also possible to use the evaluation module with a sensor module used for detecting axial clamping forces, for example in the region of a tool interface of the SK or HSK type.

A module within the meaning of the invention is understood to be a separately handleable unit, wherein each module has a dedicated housing. Since generic clamping force measuring instruments are usually tested both in the resting state of the clamping means and in the rotating state, the housings are in each case preferably substantially symmetrical, in particular rotationally symmetrical, in order to avoid unbalance.

Partial sections of the common coupling device are respectively provided at these housings, wherein the coupling device is configured for repeated and uncomplicated separation and renewed joining together. At the same time as the mechanical coupling or in advance of or after the mechanical coupling, the data connection devices of the two modules are also connected to one another, such that the components of the modules can communicate with one another, in particular in order that sensor data of the at least one force sensor can be communicated to the evaluation module.

The modularization has various advantages. One of these advantages stems from the costs. The flexibly usable evaluation module can inherently unite the majority of particularly expensive individual components, with the result that the latter do not have to be procured multiply as part of a plurality of non-modular clamping force measuring instruments. Furthermore, it may be advantageous to unite the measurement data for many clamping means, optionally also of different types, in one instrument, the evaluation module.

An essential part of the sensor module is the at least one force sensor that measures the clamping force applied by the clamping means. There are diverse possibilities for the arrangement of said at least one force sensor on the sensor module. In this regard, in the simplest case, the sensor module can make available two, three or four measurement surfaces on which the clamping means engages and which are thereby subjected to force, although only the displacement of one of the measurement surfaces is sensed by the sensor. A different preferred configuration provides for the force sensor to be embodied in the manner of a strain sensor fitted in the circumferential direction on a ring, the expansion of which is measured, from which in turn the force bringing about the expansion can be deduced. In principle, within the meaning of the invention, any sensor on the sensor module is regarded as a force sensor that can ascertain at least indirectly the radially acting clamping force of the clamping means. The at least one force sensor of the sensor unit is preferably embodied as a strain gauge (DMS), wherein the latter can be applied in particular tangentially on a ring segment that expands as a result of being subjected to force, or axially or radially on a measurement pin subjected to compressive or tensile loading.

In addition to the components that are necessarily assigned to the evaluation module according to the invention, said evaluation module preferably comprises at least one additional sensor. This can involve, in particular, a sensor for detecting the rotational speed and/or a sensor for detecting a temperature. Such additional sensors provided for detecting variables that are not directly related to the specific clamping means are preferably part of the evaluation module since these sensors are then required in smaller numbers and can be used with a plurality of sensor modules.

The evaluation module furthermore preferably comprises at least one measurement amplifier. Said measurement amplifier amplifies or modifies in some other way the output signal of at least one of the force sensors. In addition, optionally a digitization of the signals and a correction on the basis of sensor-specific calibration values are also among the tasks of the measurement amplifier unit.

It is true that the measurement amplifier, on account of its possibly provided corrections on the basis of sensor-specific calibration values, is closely related to the specific force sensor, such that, in principle, the assignment to the sensor module might appear to be fairly obvious. However, the measurement amplifier is a comparatively expensive component, such that the potential for savings as a result of transferring the measurement amplifier into the evaluation module entails considerable economic advantages.

In order to solve the problem possibly arising from this that the measurement amplifier has to take account of calibration values for different sensors in a flexible manner, various possibilities exist, each based on the fact that the measurement amplifier in the evaluation module individually takes account of the coupled sensor module.

For this purpose, the sensor module preferably has a memory, in which a unique identification of the sensor module or of the sensors thereof and/or calibration data regarding one or a plurality of sensors of the sensor module is/are stored. This allows the evaluation module, after reading out said data from the memory of the sensor module, to correct the sensor data of the sensor module individually on the basis of calibration values, either directly on the basis of calibration values in the memory of the sensor module or else on the basis of a table having sensor-specific or sensor-module-specific calibration values in the evaluation module, from which table it is possible to select the appropriate calibration data on the basis of the unique identification from the memory of the sensor module. Said table can be stored in a memory of the evaluation module.

The memory of the sensor module can additionally or alternatively also include other values, thus for example data concerning the model of the sensor module or the sensors used (type, version number or the like) and/or data regarding factory calibrations that have been carried out or are to be carried out in the future.

The memory is preferably embodied as EEPROM or Flash EEPROM so as to be overwriteable, in particular by the evaluation module or at the instruction of the evaluation module. However, read-only memory (ROM) can also be used for some data, such as, in particular the serial number or data concerning the model of the sensor module or the sensors used therein.

The evaluation module preferably has a radio interface according to the Bluetooth standard, in particular of the "Bluetooth Low Energy (LE)" type. Alternatively or additionally, the evaluation module has a USB interface for the purpose of charging an energy store of the clamping force measuring instrument and/or for the purpose of communicating stored measurement data to a computer.

In principle, although it is not absolutely necessary for data stored in the evaluation module to be transferred from here to a computer or the like, this is desirable in practice at least for data protection purposes. Radio transfer and transfer by USB connection are preferred in this case. Alternatively, removability of the memory embodied as a memory card from the evaluation module is also possible, in principle.

In particular, the "Bluetooth LE" radio standard mentioned is very valuable in practice since, on account of its efficiency, it allows an evaluation module to be used for a number of months or even years without the energy store thereof having to be charged. The use of a USB interface for charging the evaluation module affords the advantage that the charging can also be carried out on site from a laptop or an external rechargeable battery with USB connection and the evaluation module can thus remain coupled to a clamped sensor module.

Preferably, only one of the modules has an energy store in the form of a battery or a rechargeable battery and is configured to supply electronic components of the other module with energy during operation. In this case, it is considered to be preferred for the evaluation module to have the energy store and to supply coupled sensor modules in each case with current, such that the latter need not have their own energy store.

The coupling of the modules provides that the latter can be connected to one another and released from one another by means of the coupling device in a simple and rapid manner. Preferably at the same time as the mechanical coupling, in this case a coupling of the respective data connection devices is also effected in order to be able to transfer via the latter sensor data and optionally further data.

In accordance with one configuration, the coupling device for the mechanical coupling has a plurality of screws, preferably a maximum of four screws, by means of which the evaluation module is able to be fixedly screwed to the sensor module. Although this type of coupling is not usually possible in a toolless manner, this disadvantage is bearable in the area of the field of application of clamping force measuring instruments since here the appropriate tool is usually available. In addition, such a screw connection is ideal with regard to its safety even for measurements with rotating clamping means.

Alternatively, however, a coupling device embodied as a coupling device that is couplable in a toolless manner is also conceivable. By way of example, wing screws or a bayonet coupling device can be used here.

Concerning the data connection devices, a very simple design is possible, in principle, in which one of the modules has a plug or a socket, which can be manually coupled to a corresponding socket or a corresponding plug of the other module by means of a cable. In practice, however, such a configuration is very impractical.

It is preferred, therefore, for the data connection devices mentioned to be configured for the data coupling of the modules and to be arranged fixedly on the modules in such a way that the connection is produced as it were automatically by the mechanical coupling of the modules. It is particularly preferred here for the data connection device to have contact pads on the side of one of the modules. On the side of the other module, the data connection device has spring-force-loaded contact elements for bearing against the contact pads. The spring-force-loaded contact elements are preferably provided on the evaluation module. The data connection devices are accordingly arranged in such a way that they automatically come to bear against one another in a connected manner in the course of the mechanical coupling. This considerably facilitates changing the sensor module.

The contact pads and the contact elements can be configured for bearing in only one or two relative rotational positions of the modules with respect to one another. In this case, an orientation aid is preferably provided, which allows the modules to be coupled only in this one or these two orientations. This design is comparatively simple with regard to the requirements in respect of contact pads and contact elements. These can be arranged centrally in the region of the center axis or else eccentrically. The orientation aid, in particular in the form of positively locking orientation means with pin and hole at the two modules, ensures that the contact pads and contact elements come to bear against one another securely and positionally accurately.

Alternatively, the contact pads can also be embodied as concentric ring-shaped contact pads for bearing against the contact elements independently of the relative rotational positions of the modules with respect to one another. This facilitates changing sensor modules since the rotational relative orientation does not have to be taken into consideration. However, the mechanical requirements are higher on account of the sliding contact between contact pads and contact elements in the course of coupling, and so the advantage of simplified changing need not always be considerable.

As already mentioned, the data connection device is used not only for transferring sensor data, but optionally also for other data, wherein both reading and writing accesses from the sensor module and respectively to the sensor module can be provided from the perspective of the evaluation module. For transferring said other data, in particular calibration data, model data or serial numbers or the like, a digital transfer is advisable. The sensor data themselves can be transferred in analogue or digital fashion, the analogue transfer being preferred in order to avoid the need for a D/A converter on the part of the sensor module. The data connection device is therefore preferably embodied as a combined analogue and digital data connection device.

Preferably, the evaluation module, in particular by means of a microprocessor integrated into the evaluation module, is configured to utilize the data connection for further purposes in addition to communicating sensor data of the at least one force sensor and optionally further sensors of the sensor module. In this regard, the data connection can be utilized, in particular, for reading out at least one of the following items of information and for storing, communicating or displaying said information together with the sensor data, namely data concerning the model of the sensor module and/or the unique identification of the sensor module. The data connection can furthermore be configured to allow the evaluation module to read out calibration data regarding one or a plurality of sensors of the sensor module and to use said calibration data for correcting the sensor data and/or to write updated calibration data to a memory of the sensor module.

The calibration data mentioned are usually ascertained by the sensor module regularly being inserted into a clamping means with a reference measurement system in order to ascertain the necessary calibration data here. This is usually carried out by the manufacturer of the clamping force measuring instrument (factory calibration). The calibration data ascertained are then stored in the memory of the sensor module or alternatively in central calibration data tables, in particular in the memory of the evaluation module.

Furthermore, the data connection can be provided to allow the evaluation module to read out from the sensor module data regarding factory calibrations that have been carried out or are to be carried out in the future and to carry out a signaling in the event of a need for action in this regard. The sensor module can thus supply the data required for an assessment of whether a renewed factory calibration is necessary. In the event of coupling to the evaluation module, the latter recognizes the need and signals this, for example optically or acoustically or else by communicating a corresponding notification to a computer connected to the evaluation module.

The modules are preferably configured for communication via the data connection according to the IEEE 1451 standard, wherein provision is preferably made for the sensor module to have in the memory a TEDS (Transducer Electronic Data Sheet) according to said standard. In this case, TEDS forms a type of data structure provided for storing supplementary data in a form assigned to the sensor. The use of the standard mentioned and of such a TEDS data structure simplifies the development of the clamping force measuring instrument and allows recourse to components and concepts already available for this purpose.

The evaluation module preferably comprises at least one status display, in particular in the form of one or a plurality of LEDs, for displaying the status of an energy store and/or for displaying the status of a data connection to the sensor module and/or for displaying the status of a radio-based connection. Such a status display can carry out basic signaling in a very simple manner, for example can display the status of a radio connection or of an energy store or the need for a factory calibration of the coupled sensor module.

In a departure therefrom or in addition thereto, a configuration with a larger display device, that is to say a display suitable for outputting data, is also possible. In the context of the present modular clamping force measuring instrument, such a display device on the evaluation module can, in an individual case, completely or substantially eliminate the need to forward the data to a computer or the like.

The evaluation module is preferably configured to activate the radio interface for communicating sensor data to a central station only at times, in particular in accordance with a predefined time schedule or in reaction to the detection of data by a sensor module.

The described concept of a clamping force measuring instrument is advantageous in particular in the case of special clamping force measuring instruments, in particular those in which the sensor module comprises a plurality of force sensors arranged in different planes offset in relation to one another in the direction of the center axis, and/or in which the sensor module comprises a plurality of force sensors arranged in a common plane, but in a manner offset tangentially in relation to one another, relative to the center axis.

While clamping force measuring instruments having only one force sensor are usually used for most applications, in particular cases it may be desired to provide a plurality of force sensors offset in relation to one another in the circumferential direction or in the direction of extent of the center axis. In the past, corresponding special clamping force measuring instruments have usually been designed for the specific application purpose. The modular concept according to the invention allows the outlay for this to be significantly reduced since a uniform evaluation module can be used, such that only the sensor module is to be adapted on a case-by-case basis or in a customer-specific manner. However, a suitable evaluation module in this case usually has more channels in order to transfer the analogue sensor data simultaneously to the evaluation module. In this case, preferably, a multi-channel measurement amplifier for evaluating the sensor data is provided or a plurality of measurement amplifiers for separately amplifying the sensor data of different force sensors are provided.

The invention furthermore also encompasses the sensor module for a clamping force measuring instrument itself, which sensor module has at least one force sensor for detecting a clamping force applied to measurement surfaces of the sensor module by a clamping means in a radial direction outward or in a radial direction inward relative to a center axis, and which sensor module furthermore has a coupling device for coupling to an evaluation module of the type described and a data communication device for transmitting sensor data to the evaluation module.

The invention likewise furthermore encompasses the evaluation module for the clamping force measuring instrument described. The evaluation module has a coupling device for coupling to a sensor module of the type described and a data communication device for transmitting sensor data from the evaluation module. The evaluation module furthermore has a radio interface for communicating data to a receiver and/or a memory for storing data for the purpose of later read-out via a cable connection or a radio connection and/or a display device for displaying data. Such an evaluation module can also be used for sensor modules which, instead of a radially directed clamping force, measure an axially directed clamping force such as is used for example for clamping tool interfaces.

The invention in particular also relates to a set for a modular clamping force measuring instrument for radial clamping means, which has an evaluation module and a plurality of sensor modules. This configuration in which more sensor modules than evaluation modules are used as part of a common set constitutes the intended use of the clamping force measuring instrument according to the invention.

BRIEF DESCRIPTION OF THE DRAWINGS

Further advantages and aspects of the invention are evident from the claims and from the following description of preferred exemplary embodiments of the invention, which are explained below with reference to the figures.

DETAILED DESCRIPTION OF THE EXEMPLARY EMBODIMENTS

Figure 1:
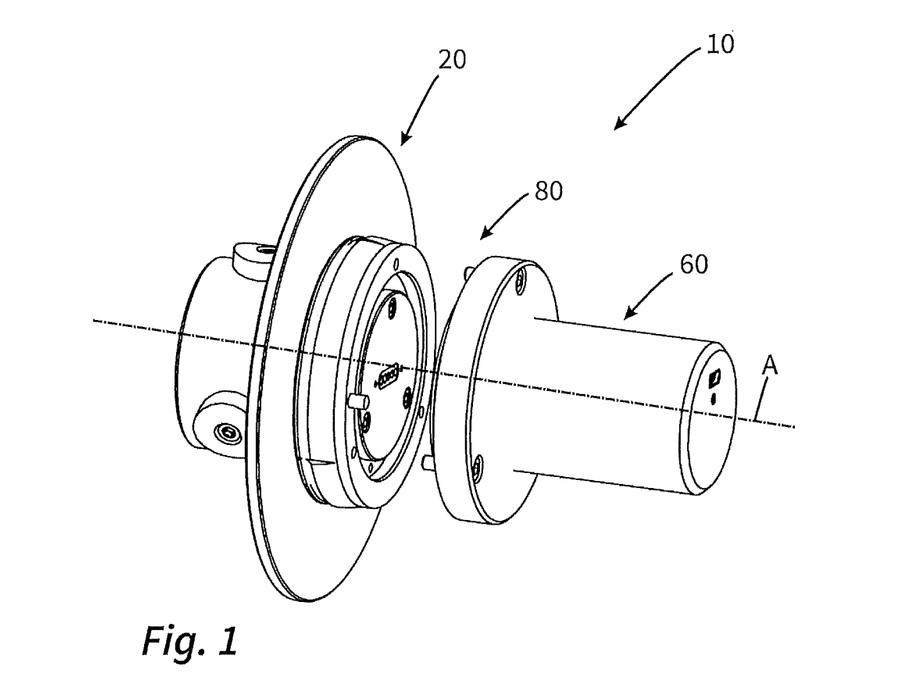
FIG. 1 shows a clamping force measuring instrument according to the invention in its modular configuration having two individual modules.

FIG. 1 initially shows very generally the basic concept of a clamping force measuring instrument 10 according to the invention. Said clamping force measuring instrument 10 has two modules, namely an evaluation module 60 and a sensor module 20, which can be coupled to one another on a case-by-case basis by means of a coupling device 80. A further type of a sensor module 40 is likewise illustrated in the subsequent figures.

Figure 2:
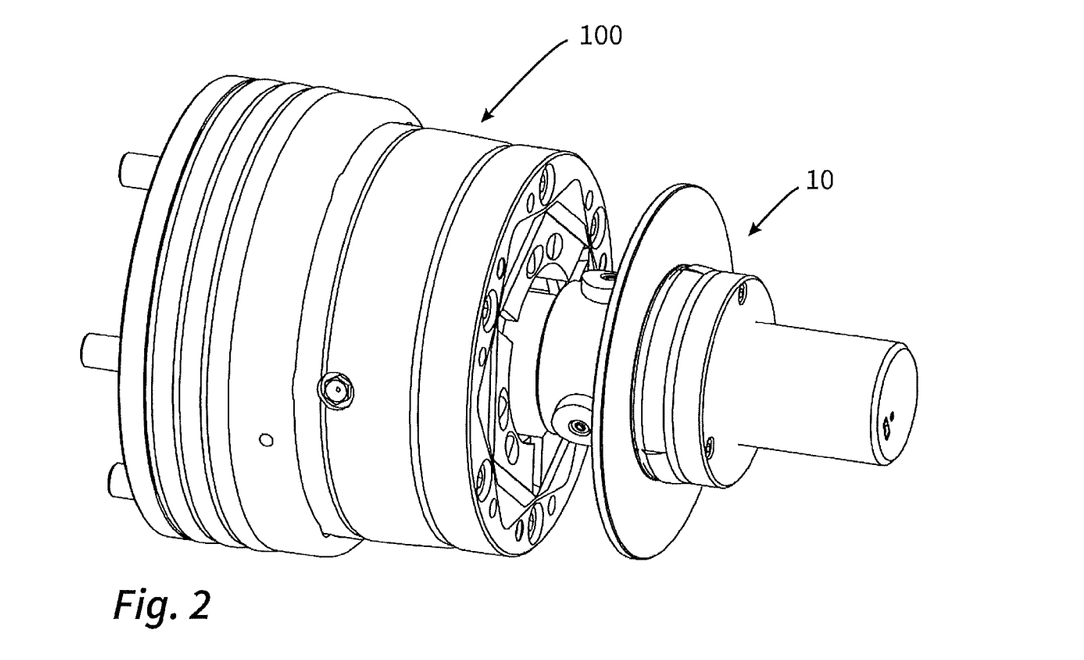
FIG. 2 shows by way of example the use of the clamping force measuring instrument from FIG. 1.

In the joined-together state, which is evident from FIG. 2, for example, the two modules 20, 60 jointly form the clamping force measuring instrument 10. The modular configuration makes it possible to use the same evaluation module 60 not only with the sensor module illustrated in FIGS. 1 to 3, but also with the alternative sensor module illustrated in FIGS. 4A and 4B. The overall functionality of the clamping force measuring instrument is distributed between the two modules 20, 60, as will be explained in even greater detail hereinafter.

FIG. 2 shows how the clamping force measuring instrument 10 composed of the two individual modules (20 or 40) and 60 is inserted into a clamping means 100 in the form of a jaw chuck. It should already be pointed out at this juncture that the clamping force measuring instrument 10 has measurement surfaces 24, which, after the clamping force measuring instrument 10 has been inserted into the clamping means 100, are subjected to force by a clamping of the clamping means 100. The deflection is detected at least at one of said measurement surfaces in order thereby indirectly to measure the force applied by the clamping means 100 for the purpose of subsequent further processing.

In principle, for subdividing the functionality of the clamping force measuring instrument between the sensor modules 20, 40, on the one hand, and the evaluation module 60, on the other hand, it should be stated that is expedient, for the purpose of a simple configuration and accordingly a low price, to fashion the sensor modules 20, 40 comparatively simply and to provide the comparatively expensive partial components—as far as possible—in the evaluation module 60.

Figure 3:
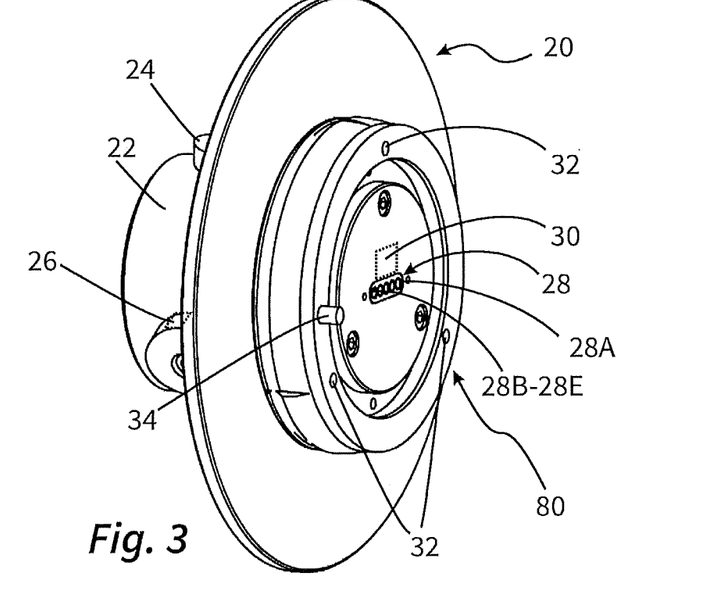
FIG. 3 shows, in a separate illustration, a first variant of a sensor module for the clamping force measuring instrument.
Figure 4A:
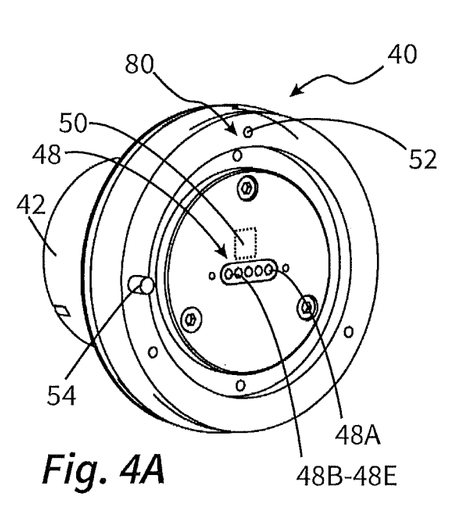
FIGS. 4A and 4B show a second variant of a sensor module for the clamping force measuring instrument.
Figure 4B:
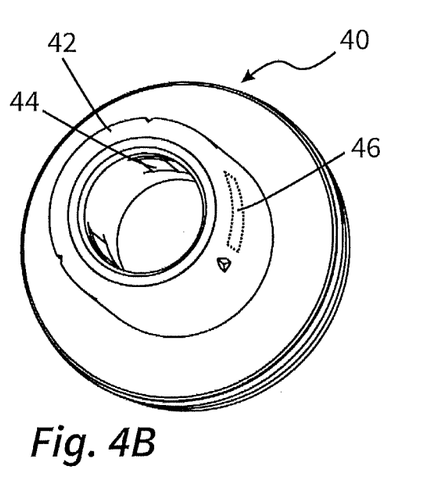

FIG. 3 and FIGS. 4A and 4B show the individual components of the sensor modules 20, 40. The sensor module 20 illustrated in FIG. 3 is a sensor module 20 for testing external clamping means, that is to say clamping means whose clamping surfaces or clamping jaws apply the clamping force by radial displacement inward in the direction of a center axis A. The housing of the sensor module 20 has an approximately cylindrical measurement region 22, on the outer side of which a total of three measurement surfaces 24 are provided in a manner distributed over the circumference, said measurement surfaces acting on measurement pins and force sensors 26 fitted thereto in a manner not illustrated in more specific detail. There are actually many possibilities for the arrangement and configuration of the force sensor 26, for example in radial or tangential orientation.

On that side of the sensor module 20 which faces away from the measurement region 22, said sensor module is provided with a part of a coupling device 80. Said coupling device has three threaded holes 32 and an orientation pin 34 for the purpose of mechanical coupling. The interaction of the evaluation module with this part of the coupling device 80 will additionally be explained hereinafter with reference to FIGS. 5A, 5B and also FIGS. 6 and 7. In addition to the means for mechanical coupling, a data communication device 28 is provided on the side facing away from the measurement region. This involves a total of five contact pads provided in addition to a ground connection. The first contact pad 28A is provided for a digital data transfer, which will additionally be explained hereinafter. The other four contact pads 28B-28E are provided for an analogue transfer of the data of the force sensor 26. In addition, the sensor module 20 has a memory 30, in which various data can be stored, in particular in digital form the type of the sensor module 20 or the sensors 26 thereof, the time of the last or next factory calibration, the currently stored calibration data for correcting measurement data of the force sensor 26, and a unique serial number of the sensor module 20.

FIGS. 4A and 4B show, in a manner corresponding to FIG. 3, a second sensor module 40 for checking internal clamping means. For this purpose, the cylindrical measurement region 42 here is configured in the manner of a hollow cylinder, on the inner side of which the measurement surfaces 44 are provided and on the outer side of which the at least one force sensor 46 is provided. On the opposite side, illustrated in FIG. 4A, the conditions correspond almost identically to those of the sensor module from FIG. 3. Here, too, a mechanical coupling device is provided, having threaded holes 52 and an orientation pin 54. The data communication device 48, too, corresponds in terms of its construction to that data communication device 28 of the configuration from FIG. 3, together with the linking of a digital channel to the memory 50 and an analogue data connection to the force sensor 46.

Figures 5A, 5B:
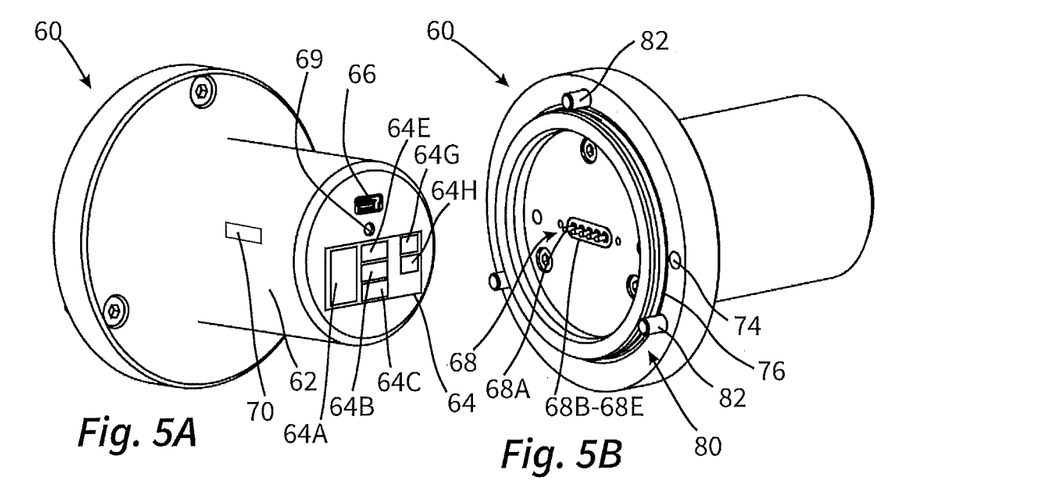
FIGS. 5A and 5B show the evaluation module of the clamping force measuring instrument in two perspectives.

FIGS. 5A and 5B show the evaluation module as a counterpart in relation to the two sensor modules 20, 40 from the previous figures. The evaluation module 60 has a housing 62, on which through holes with screws 72 and a hole 74 for receiving the orientation pin 34, 54 are provided in a manner corresponding to the coupling device 80 of the sensor modules 20, 40 and the data communication devices 28, 48 thereof. The data communication device is fashioned somewhat differently here since resiliently deflectable contact pins 68A to 68E are provided instead of contact pads 28A to 28E. Said contact pins bear as intended against the contact pads 28A to 28E or 48A to 48E when the evaluation module 60 is screwed to one of the sensor modules 20, 40 by means of the screws 72. A seal 76 is additionally provided, which during operation prevents contaminants from being able to pass into the region of the electrical contacting.

The evaluation module 60 comprises the main electronic components of the clamping force measuring instrument. Said components are clustered in an evaluation device 64, which is merely illustrated schematically. This involves a measurement amplifier 64A which conditions and digitizes the measurement data acquired via the data connection device 68. In this case, said measurement amplifier uses calibration data read out previously from the memory 30, 50 of the sensor module via the data line. A microprocessor 64B is provided for controlling this measurement force amplifier, said microprocessor accessing a memory 64C. The data acquired and conditioned by the measurement amplifier 64A can be stored here. In addition, the evaluation device 64 has a radio interface 64E, preferably of the Bluetooth LE standard, via which the data from the memory 64C can be communicated to a central entity, such as a personal computer, for example, in the factory building. Furthermore, the evaluation module 60 has a USB connection 66, which can be used for charging an energy store 70 of the evaluation module. In addition, data from the memory 64C can also be transferred to a personal computer or a tablet computer as necessary via said connection. As a display device, the evaluation module 60 comprises an LED 69, which can signal various essential status indications, thus for example the status of the radio connection of the radio interface 64E, a state of charge of the energy store 70 or alternatively the need to recalibrate the coupled sensor module, wherein this last can result from the calibration data from the memories 30, 50.

Figure 6:
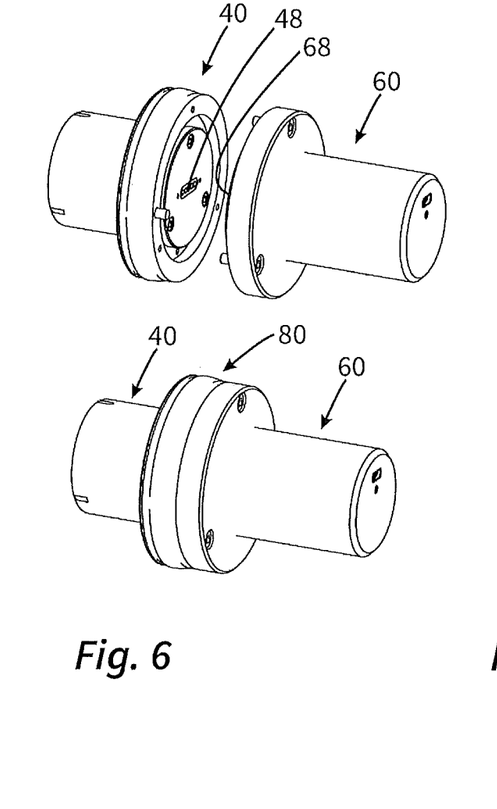
FIGS. 6 and 7 illustrate the coupling process by means of which the respective sensor module and the evaluation module are joined together to form a unit for the purpose of the subsequent use.
Figure 7:
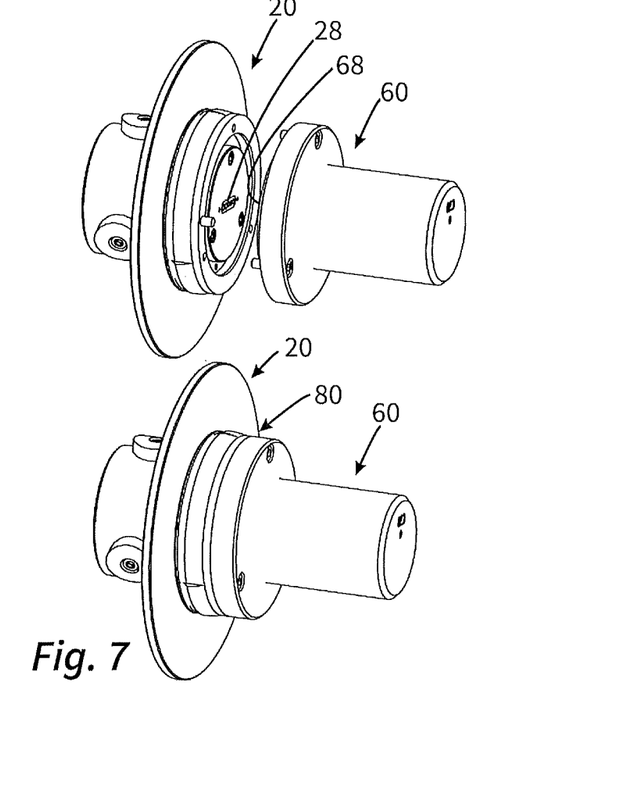

As illustrated in FIGS. 6 and 7, the same evaluation module 60 can be coupled both to the sensor module 20 and to the sensor module 40. This affords a major advantage in practice. The expensive partial components of the evaluation module 60 do not have to be procured in the same numbers as sensor modules 20, 40. Instead, in principle as many sensor modules 20, 40 as desired can be connected to the same evaluation module in order to carry out a measurement process. Other sensor modules such as those for measuring an axial clamping force are also possible.

The invention claimed is:

1. A clamping force measuring instrument for radial clamping means, the clamping force measuring instrument comprising:
   at least one measurement surface;
   at least one force sensor for detecting a clamping force applied to the at least one measurement surface by clamping means in a radial direction outward or in a radial direction inward relative to a center axis;
   an evaluation device for evaluating sensor data of the at least one force sensor, the evaluation device comprising:
   a radio interface for communicating data to a receiver; and/or
   a memory for storing data for the purpose of later read-out via a cable connection or a radio connection; and/or
   a display device for displaying data;

wherein the clamping force measuring instrument comprises a modular clamping force measuring instrument and comprises at least two modules including an evaluation module and a sensor module, the sensor module comprising the at least one measurement surface and the at least one force sensor, the evaluation module comprising the radio interface, the memory and/or the display device, and the sensor module and the evaluation module are configured for mechanical coupling to one another by a mechanical coupling device and each have a data connection device, wherein the data connection devices are configured for connection to one another in order to produce a data connection when the sensor module is mechanically coupled to the evaluation module.

2. The clamping force measuring instrument as claimed in claim 1, wherein the evaluation module comprises at least one additional sensor, the at least one additional sensor comprising:
   a sensor for detecting a rotational speed; and/or
   a sensor for detecting a temperature.

3. The clamping force measuring instrument as claimed in claim 1, wherein the evaluation module comprises at least one measurement amplifier.

4. The clamping force measuring instrument as claimed in claim 1, wherein:
   the evaluation module has a radio interface according to the Bluetooth standard; and/or
   the evaluation module has a USB interface for charging an energy store of the clamping force measuring instrument and/or for communicating stored measurement data to a computer.

5. The clamping force measuring instrument as claimed in claim 1, wherein the sensor module has a memory, at least one of the following items of information being stored in the memory:
   data concerning a model of the sensor module; and/or
   a unique identification of the sensor module; and/or
   calibration data regarding one or a plurality of sensors of the sensor module; and/or
   data regarding factory calibrations which have been carried out or are to be carried out in the future.

6. The clamping force measuring instrument as claimed in claim 1, wherein one of the evaluation module or the sensor module has an energy store in the form of a battery or a rechargeable battery and is configured to supply electronic components of the other of the evaluation module or the sensor module with energy during operation.

7. The clamping force measuring instrument as claimed in claim 1, wherein:
   the mechanical coupling device has a plurality of screws which fix the evaluation module to the sensor module; or
   the mechanical coupling device is configured to mechanically couple the sensor module and the evaluation module to one another in a toolless manner.

8. The clamping force measuring instrument as claimed in claim 1, wherein the data connection device of one of the sensor module or the evaluation module has contact pads on a side of the one sensor module or evaluation module, and the data connection device of the other of the sensor module or the evaluation module has, on a side of the other of the sensor module or the evaluation module, spring-force-loaded contact elements for bearing against the contact pads.

9. The clamping force measuring instrument as claimed in claim 1, wherein the data connection devices comprise a combined analog and digital data connection device.

10. The clamping force measuring instrument as claimed in claim 1, wherein:
    the evaluation module is configured to read out at least one of the following items of information via the data connection in addition to sensor data of the at least one force sensor or other sensors of the sensor module and to store, to communicate or to display the information together with the sensor data:
       data concerning a model of the sensor module; and/or
       a unique identification of the sensor module; and/or
    the evaluation module is configured to read out calibration data regarding one or a plurality of sensors of the sensor module via the data connection in addition to sensor data of the at least one force sensor or other sensors of the sensor module and to use the calibration data for correcting the sensor data and/or to write calibration data to a memory of the sensor module; and/or
    the evaluation module is configured to read out data regarding factory calibrations that have been carried out, or are to be carried out in the future, via the data connection in addition to sensor data of the at least one force sensor or other sensors of the sensor module and to carry out a signaling in the event of a need for calibration.

11. The clamping force measuring instrument as claimed in claim 1, wherein:
    the evaluation module and the sensor module are configured for communication via the data connection according to the IEEE 1451 standard, the sensor module having in a memory a Transducer Electronic Data Sheet according to the IEEE 1451 standard; and/or
    the evaluation module comprises at least one status display for displaying a status of an energy store, and/or for displaying a status of the data connection to the sensor module, and/or for displaying a status of a radio-based connection; and/or
    the evaluation module is configured to activate the radio interface for communicating sensor data to a central station only at times; and/or
    the at least one force sensor of the sensor module comprises a strain gauge.

12. The clamping force measuring instrument as claimed in claim 1, wherein:
    the sensor module has a plurality of force sensors arranged in different planes offset relative to one another in the direction of the center axis; and/or
    the sensor module has a plurality of force sensors arranged in a common plane, and in a manner offset tangentially in relation to one another, relative to the center axis.

13. The clamping force measuring instrument as claimed in claim 7, wherein the mechanical coupling device comprises a toolless bayonet coupling device.

14. The clamping force measuring instrument as claimed in claim 8, wherein:
    the contact pads and the contact elements are configured to bear against one another in one or two relative rotational positions of the sensor module and the evaluation module with respect to one another, and the clamping force measuring instrument comprises an orientation aid configured to permit mechanical coupling of the sensor module and the evaluation module in only the one or two relative rotational positions; or
    the contact pads comprise concentric ring-shaped contact pads configured to bear against the contact elements independently of relative rotational positions of the sensor module and the evaluation module with respect to one another.

15. The clamping force measuring instrument as claimed in claim 11, wherein the evaluation module is configured to activate the radio interface in accordance with a predefined time schedule or in reaction to a detection of data by the sensor module.

16. The clamping force measuring instrument as claimed in claim 12, further comprising a multi-channel measurement amplifier for evaluating sensor data, or a plurality of different force sensors and a plurality of measurement amplifiers for separately amplifying sensor data of the plurality of different force sensors.

17. The clamping force measuring instrument as claimed in claim 1, wherein the mechanical coupling device is configured to non-movably mechanically couple the sensor module and the evaluation module to one another.

18. A modular clamping force measuring instrument for use with a radial clamping arrangement, said modular clamping force measuring instrument comprising:
   a sensor module comprising at least one measurement surface, at least one force sensor and a data connection device, said at least one force sensor being configured to detect a clamping force applied to said at least one measurement surface by a radial clamping arrangement which applies a radially-inwardly directed or a radially-outwardly directed clamping force;
   an evaluation module for evaluating sensor data of said at least one force sensor, said evaluation module comprising a data connection device and one or a combination of the following: a radio interface for communicating data to a receiver; a memory for storing data for later readout via a cable or radio connection; and/or a display device configured to display data; and
   a mechanical coupling arrangement cooperating between said sensor module and said evaluation module and configured to non-movably mechanically couple said sensor module and said evaluation module to one another, said data connection devices connecting to one another to produce a data connection when said sensor module and said evaluation module are mechanically coupled to one another by said mechanical coupling arrangement.

19. The modular clamping force measuring instrument as claimed in claim 18, wherein said at least one measurement surface of said sensor module is disposed so as to face radially outwardly, with respect to a central axis of said modular clamping force measuring instrument, to receive a radially-inwardly directed clamping force applied thereto, or said at least one measurement surface of said sensor module is disposed so as to face radially inwardly, with respect to a central axis of said modular clamping force measuring instrument, to receive a radially-outwardly directed clamping force applied thereto.

20. The modular clamping force measuring instrument as claimed in claim 18, wherein said sensor module and said evaluation module comprise respective mating faces disposed in opposed relation with one another when said sensor module and said evaluation module are mechanically coupled to one another by said mechanical coupling arrangement, said data connection device of one of said sensor module or said evaluation module has at least one contact element disposed on said mating face of said one sensor module or evaluation module and said data connection device of the other of said sensor module or said evaluation module has at least one contact element disposed on said mating face of the other said sensor module or evaluation module, said at least one contact elements being arranged on the respective said mating faces to bear against one another to produce said data connection when said sensor module and said evaluation module are mechanically coupled to one another by said mechanical coupling arrangement.

* * * * *